3,405,073
ENHANCEMENT OF RESISTANCE OF ETHYLENE SULFIDE POLYMERS TO HEAT DETERIORATION
Charles Abramoff, Brooklyn, N.Y., assignor to Argus Chemical Corporation, Brooklyn, N.Y., a corporation of New York
No Drawing. Filed May 28, 1965, Ser. No. 459,890
7 Claims. (Cl. 252—400)

ABSTRACT OF THE DISCLOSURE

Stabilizers suitable for enhancing the resistance of ethylene sulfide polymers to deterioration at temperatures in excess of about 200° C. are provided. The stabilizer is an organotin compound having organic radicals attached to tin through oxygen, and no organic radicals attached to tin through carbon. Stabilizer combinations also are provided comprising such organotin compound, and a compound of a polyvalent metal selected from Groups II to VIII of the Periodic Table in an amount to enhance the stabilizing effect of the tin salt in the presence of the ethylene sulfide polymer.

---

This invention relates to compositions useful in the enhancement of the resistance of ethylene sulfide polymers to heat deterioration, comprising organotin compounds having organic radicals attached to tin through oxygen, and combinations of such organotin compounds with compounds of polyvalent metals, and to a process of enhancing the resistance of ethylene sulfide polymers to heat deterioration, and to ethylene sulfide polymer compositions having an enhanced resistance to heat deterioration, due to incorporation therewith of such compounds.

Ethylene sulfide polymers have been produced having relatively low molecular weights, of the order of 1000 to 2000. Such polymers are composed of ethylene sulfide units linked in a long chain $(CH_2CH_2-S)_n$, where $n$ represents the number of such units in the chain, and are thus of the nature of polymeric ethylene thioethers. The utility of these polymers as plastic materials for industrial applications is seriously limited, however, due to their lack of adequate mechanical strength.

Recently, ethylene sulfide polymers have been prepared having a considerably higher molecular weight, of the order of 10,000 and more, and a melting point of at least 200° C. These new ethylene sulfide polymers have been prepared by a number of methods, and one of which is disclosed in Belgian Patent No. 643,269 and which comprises polymerizing at least one monomeric episulfide in the presence of a non-ferrous heavy metal catalyst such as a hydroxide, sulfate, sulfide, silicate, oxide or acetate of cadmium, or a peroxide, sulfide, chromate, adipate, oxalate, oxide or hydroxide of zinc or mercury, or a carbonate of zinc, manganese, cadmium, lead, cobalt, nickel or mercury. Another method of preparing the higher molecular weight ethylene sulfide polymers is disclosed in Belgian Patent No. 643,276 and comprises polymerizing at least one monomeric episulfide by contacting the monomer with, for example, oxides of sodium, potassium, calcium, magnesium, strontium, barium, tin, bismuth, lead, antimony, iron, cobalt and nickel.

Such polymers have many improved properties, as compared to the low molecular weight polymers. However, when these ethylene sulfide polymers are processed at elevated temperatures, above their softening point, such as in injection molding, they tend to suffer a reduction in melt viscosity, as evidenced by increase in melt index. Many compounds have been proposed for use with ethylene sulfide polymers to enhance their resistance to heat deterioration. Netherlands published application No. 6,403,189 discloses stabilizers for such polymers which comprise amides, amines, hydroxy-substituted amines, polyamines or a compound having nitrogen in a ring structure. However, these heat stabilizers have been found to reduce the oxidation stability of the polymer, and also to impart a brown color to the polymer. Evidently, the heat stabilizers themselves join in whatever reaction, possibly a thermal oxidative degradation, leads to reduction in melt viscosity of the polymer. The higher processing temperatures undoubtedly greatly accelerate heat degradation of these polymers.

It has now been discovered that certain organotin compounds are capable of arresting not only the deterioration in melt viscosity of high melting ethylene sulfide polymers at temperatures above 200° C., but also the discoloration of such polymers at elevated temperatures. Accordingly, the invention provides ethylene sulfide polymer compositions sufficiently resistant to heat deterioration to be processable using conventional converting methods and equipment at such temperatures.

In accordance with the instant invention, an organotin compound having organic radicals attached to tin through oxygen, such as a tin carboxylate, phenolate or alcoholate, is employed to enhance resistance to heat deterioration of such ethylene sulfide polymers. Such compounds are effective in surprisingly small amounts. Frequently, their efficacy is enhanced by a compound of another polyvalent metal, or another tin compound. The second polyvalent metal can be any metal selected from Groups II to VIII of the Periodic Table, including, for example, germanium, tin, lead, arsenic, antimony, bismuth, magnesium, strontium, calcium, barium, aluminum, iron, cadmium, cobalt, nickel, zinc, titanium, zirconium, vanadium, mercury, manganese, copper, chromium, and hafnium. The second polyvalent metal compound helps to minimize or prevent discoloration of the ethylene sulfide polymer. The second polyvalent metal compound may also supplement the enhanced heat resistance imparted to the ethylene sulfide polymer by the organotin compound, without disadvantageously affecting the desirable properties of the ethylene sulfide polymer. In many cases, an enhanced or synergistic effect is observed.

An organic phosphite can also be employed in combination with the organotin compound, with or without the Group II to VIII metal compound. The organic phosphite is effective to further supplement the organotin compound in enhancing the resistance of the ethylene sulfide polymer to heat deterioration.

Phenols add to the heat stabilizing effectiveness of the tin compounds of this invention, and may also impart improved oxidation resistance. Monocyclic and polycyclic phenols can be used.

The organotin compound can be a salt of an organic carboxylic acid, a phenol or an alcohol. The compound should be free from sulfur-containing groups which decompose under the conditions to which the polymer may be subjected with formation of free sulfur.

The organic acid group of the organotin carboxylates will have ordinarily from about one to about twenty carbon atoms. Aliphatic, aromatic, cycloaliphatic and oxygen-containing heterocyclic mono- and poly-carboxylic acid groups are exemplary.

The acid groups can be substituted, if desired, with inert groups such as halogen, nitro, and hydroxyl. The oxygen-containing heterocyclic acid groups include oxygen and carbon in the ring structure, of which alkyl-substituted furoic acid groups are exemplary. As exemplary of the organic acid groups there can be mentioned the following: caproic, capric, 2-ethyl hexoic, caprylic, pelargonic, hendecanoic, lauric, tridecanoic, pentadecanoic, margaric, arachidic, suberic, azelaic, sebacic, brassylic, thapsic, 2-propyl-1,2,4-pentane-tricarboxylic, chlorocaproic, hydroxy-capric, stearic, hydroxy stearic, palmitic, oleic, linoleic, myristic, oxalic, adipic, succinic, tartaric, α-naphthoic, hexahydrobenzoic, benzoic, phthalic, phenyl-acetic, terephthalic, glutaric, monomethyl succinate, isobutyl benzoic, phthalic monoethyl ester, ethyl-benzoic, isopropylbenzoic, ricinoleic, maleic, fumaric, mono-ethyl maleate, p-t-butylbenzoic, n-hexyl benzoic, salicyclic, β-naphthoic, β-naphthalene acetic, orthobenzoyl benzoic, naphthenic, abietic, dehydroabietic, methyl furoic and thienoic.

The alcohol group of the organotin alcoholates can be derived from any aliphatic, aromatic, cycloaliphatic, or heterocyclic monohydric or polyhydric alcohol containing from one to about ten hydroxyl groups, and from about one to about twenty carbon atoms.

Typical monohydric alcohol groups include butyl ethyl, propyl, nonyl, hexyl, 2-ethylhexyl, lauryl, isooctyl, decyl, palmityl, stearyl, oleyl, benzyl, α- and β-phenethyl, 1,2,3,4-tetrahydro - 2 - naphthyl, 1 - naphthalene methyl, cyclohexyl, cyclopentyl, cyclododecyl, methyl, tetrahydrofurfuryl, and thenyl.

Typical polyhydric alcohols from which the organotin alcoholates can be derived include pentaerythritol, dipentaerythritol, glycerol, ethylene glycol, 1,2-propylene glycol, 1,3-propylene glycol, 1,2-butylene glycol, 1,3-butylene glycol, 1,4-butylene glycol, diethylene glycol and butyl glucoside, neopentyl glycol, 9-octadecene-1,12-diol, 1,4-cyclohexane diol, and 1,4-cyclopentane diol, erythritol, mannitol, sorbitol, and tripentaerythritol.

The phenol component of the organotin phenolates can be derived from a monocyclic or polycyclic mono or poly phenol or hydrocarbon-substituted phenol. The hydrocarbon substituent contains from one to thirty carbon atoms, and there can be up to five substituents per phenolic nucleus. The phenol can contain one or more phenolic nuclei, and one, two or more phenolic groups. In addition, the phenolic nucleus can contain an amino group.

Among such organotin phenolate groups there can be mentioned those derived from phenol, o-cresol, p-cresol, m-cresol, 2,6-ditertiary-butyl-p-cresol, Bisphenol A, p-propyl-phenol, p-n-butyl phenol, p-isoamyl phenol, o-isooctyl phenol, p-t-nonylphenol, m-n-decyl phenol, o-t-octyl phenol, p-iso-hexyl phenol, p-octadecyl phenol, 2,6-diisobutyl phenol, 2-methyl-4 - propyl phenol, 2,6 - diamyl phenol, 2-methyl-4-isohexyl phenol, 2-methyl-6 - t - octyl phenol, 2,6-di-t-nonyl phenol, 2,4-di-t-dodecyl phenol, p-2-ethylhexyl phenol, and phenyl phenol, phloroglucinol, resorcinol, catechol, eugenol, pyrogallol, α-naphthol, β-naphthol, p-octyl phenol, p-octyl cresol, p-dodecyl phenol, p-isooctyl-m-cresol, p-isohexyl-o - cresol, 2,6 - ditertiary-butyl phenol, 2,6-diisopropyl-phenol, 2,4-ditertiary-butyl-m-cresol, methylenebis(2,6-ditertiary-butyl-phenol), 2,2-bis(4-hydroxy phenyl) propane, methylene-bis(p-cresol), 2,4'-thiobisphenol, 4,4'-thiobis(3-methyl-6-tertiary - butyl-phenol), 2,2-thiobis(4-methyl-6-tertiary - butyl - phenol), 2,6-diisooctyl resorcinol, 4-octyl pyrogallol, and 3,5 - ditertiary-butyl catechol. Among the aminophenols which can be used are 2-isooctyl-p-aminophenol, N-stearoyl-p-amino-phenol, 2,6-diisobutyl-p-aminophenol, and N-ethyl-hexyl-p-aminophenol.

Specific examples of organotin salts suitable for use herein include, but are not limited to, stannous stearate, stannous-2-ethylhexoate, stannous benzoate, stannous laurate, stannous oxalate, stannous naphthenate, stannous hexahydrobenzoate, stannous succinate, stannous maleate, stannous tartrate, stannous phenolate, stannous octyl phenolate, stannous β-naphtholate, stannous t-butyl catecholate, stannous salt of Bisphenol A, stannous cyclohexylidene bis-phenolate, stannous furoate, stannous ethoxide, stannous hexoxide, stannous octoxide, stannous decoxide, stannous 2-ethyl hexoxide, stannous glycerolate, and 2,4,8,10-tetraoxa-3,9-distanna-6,6-bi-spiro - undecane.

The Group II to VIII polyvalent metal compound can be a salt of an inorganic acid, including oxygen acids, or of an organic acid, or of a phenol, or an alcohol. The compound can also be an oxide of said metal. Examples of organic acids, phenols and alcohols which can be used with the Group II to VIII metal are the same as those used with tin and have been set forth hereinbefore.

As exemplary of the inorganic acids which can be used in the form of their Group II to VIII polyvalent metal salts, there can be mentioned the following: sulfuric acid, nitric acid, nitrous acid, phosphoric acid, phosphorous acid, hydrochloric acid, and other halogen acids, fluosilicic acid, and carbonic acid.

Specific examples of Group II to VIII metal compounds suitable for use herein include, but are not limited to, zinc-2-ethylhexoate, zinc oxide, zinc stearate, lead 2-ethyl-hexoate, titanium dioxide, tetra-2-ethylhexyl titanate, antimony trioxide, tri-isooctyl antimonite, lead oxide, lead nonylphenolate, zirconium tetraethoxide, basic aluminum acetate, calcium benzoate, magnesium p-chlorobenzoate, strontium laurate, barium stearate, manganese naphthenate, manganese-t-butyl benzoate, cadmium acetate, cadmium stearate, cadmium salicylate, cupric sulfate, cupric orthophosphate, dicalcium phosphate, ferric phosphate, nickel carbonate, chromium acetylacetonate, zinc acetylacetonate, bismuth subnitrate, barium metaborate, germanium 2-ethyl hexoate, and the specific tin compounds set forth hereinbefore.

The organic phosphite can be any organic phosphite having one or more organic radicals attached to phosphorus through oxygen. These radicals can be monovalent radicals in the case of the triphosphites, diphosphites and monophosphites, which can be defined by the formula:

$$R_1-O-P-O-R_3$$
$$|$$
$$O$$
$$|$$
$$R_2$$

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

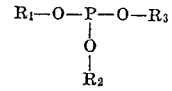

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

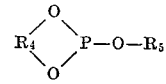

More complex phosphites are formed from trivalent organic radicals, of the type:

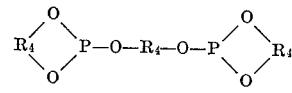

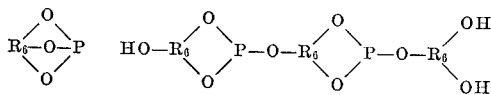

in which $R_6$ is a trivalent organic radical of any of the types of $R_1$ to $R_5$, inclusive, as defined above.

An especially preferred class of organic phosphites have a bicyclic aromatic group attached to phosphorus through oxygen, with no or one or more phenolic hydroxy groups on either or both of the aromatic rings. These phosphites are characterized by the formula:

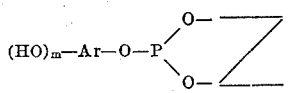

in which Ar is a bicyclic aromatic nucleus and $m$ is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type $(HO)_m$—Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di-(2-ethylhexyl)(isooctylphenyl) phosphite, tri(2-cyclohexylphenyl) phosphite, tri-α-naphthyl phosphite, tri(phenylphenyl) phosphite, tri(2-phenyl ethyl) phosphite, monododecyl phosphite, di(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2 - butoxy-1,3,2-dioxaphosphorinane, 2 - octoxy - 5,5-dimethyldioxaphosphorinane, 2-cyclohexyloxy - 5,5 - diethyldioxaphosphorinane, monophenyl phosphite, 2-ethylhexyl phosphite, isooctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary of the bis aryl phosphites are: bis(4,4'-thiobis(2-tertiary butyl-5-methyl-phenol)) isooctyl phosphite, mono(4,4'-thio-bis(2-tertiary-butyl-5-methyl-phenol)) diphenyl phosphite, tri-(4,4' - n - butylidene - bis(2-tertiary-butyl-5-methyl-phenol)) phosphite, (4,4'-benzylidene-bis (2-tertiary-butyl-5-methyl - phenol)) diphenyl phosphite, isooctyl 2,2'-bis(parahydroxyphenyl) propane phosphite, tridecyl 4,4'-n-butylidene-bis(2-tertiary butyl - 5 - methyl-phenol) phosphite, 4,4'-thiobis(2-tertiary butyl-5-methyl-phenol) phosphite, 2 - ethylhexyl - 2,2' - methylene-bis(4-methyl-6-1'-methylcyclohexyl) phenol phosphite, tri(-2,2'-bis-(para-hydroxy phenyl) propane) phosphite, tri(-4,4'-thio-bis(2-tertiary-butyl-5-methyl-phenol) phosphite, isooctyl-(2,6-bis(2'-hydroxy-3,5 - dinonylbenzyl) - 4 - nonyl phenyl)) phosphite, tetra-tridecyl 4,4' - n - butylidene-bis-(2-tertiary butyl-5-methyl phenyl) diphosphite, tetra-isooctyl 4,4'-thiobis(2-tertiary butyl - 5 - methyl phenyl) diphosphite, 2,2'-methylene-bis(4-methyl 6-1'-methyl cyclohexyl phenyl) polyphosphite, isooctyl-4,4'-isopropylidene-bis-phenyl-polyphosphite, 2-ethylhexyl-2,2'-methylene-bis-(4-methyl - 6,1'-methyl - cyclohexyl) phenyl triphosphite, tetra-tridecyl-4,4' - oxydiphenyl diphosphite, tetra - n - dodecyl - 4,4'-n-butylidenebis (2 - tertiary-butyl - 5 - methyl- phenyl) diphosphite, tetra-tridecyl-4,4'-isopropylidene bisphenyl diphosphite, tri-tridecyl butane-1,1, and 3-tris(2'-methyl-5'-tertiary-butylphenyl-4'-) triphosphite.

The monocyclic phenols which can be employed have the structure:

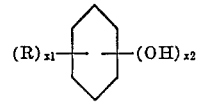

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

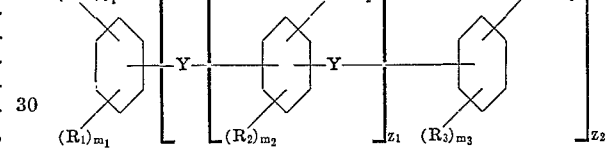

wherein $R_1$, $R_2$ and $R_3$ are inert substituent groups of the type of R above, Y is a bivalent linking radical; $m_1$ is an integer from zero to a maximum of 5- $(z_2+y_1)$, $m_2$ can be an integer from zero to three and $m_3$ an integer from zero to four, $z_1$ can be an integer from zero to about six and $z_2$ an integer from one to five, preferably one. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

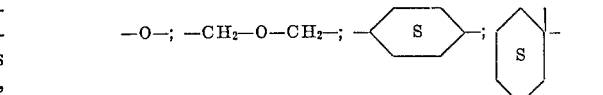

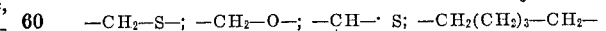

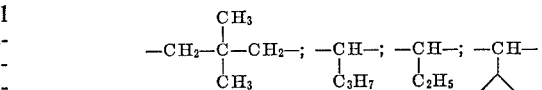

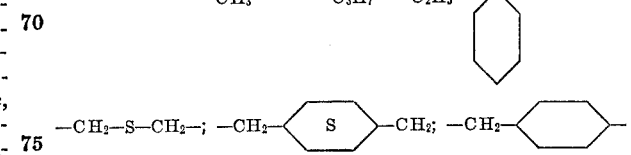

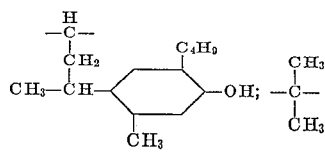

Representative phenols include guaiacol, resorcinol monoacetate, vanillin, butyl salicylate, 2,6-ditert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxy-anisole, p-n-decyloxy phenol, p-n-decyloxy cresol, nonyl n-decyloxy cresol, eugenol, isoeugenol, glyceryl monosalicylate, methyl-p-hydroxy-cinnamate, 4-benzyloxy-phenol, p-acetylaminophenol, p-stearyl-aminophenol, methyl - p - hydroxybenzoate, p-di-chlorobenzoyl-aminophenol and p-hydroxysalicyl anilide.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexylcatechol, 2,6-ditertiary-butyl resorcinol, 2,6-diisopropyl phloroglucinol.

Exemplary polyhydric bisphenols are methylenebis-(2,6-ditertiarybutyl-phenol), 2,2-bis-(4-hydroxy phenyl)-propane, methylene-bis(p-cresol), 4,4'-oxobis-(3-methyl-6-isopropyl phenol), 2,2'-oxobis-(4-dodecyl phenol), 4,4'-n-butylidenebis-(2-tertiary butyl-5-methylphenol), 4,4'-benzyl-idenebis-(2-tertiary butyl-5-methylphenol), 4,4'-cyclohexyl-idenebis-2-tertiary butylphenol), 4,4'-thiobisphenol, 4,4'-thiobis(3-methyl - 6 - tertiary - butylphenol), 2,2'-thiobis(4-methyl-6-tertiary-butylphenol), 2,2'-methylenebis(4-methyl-6-(1'-methyl-cyclohexyl)-phenol), 2,6-bis(2'-hydroxy - 3' - tertiary - butyl-5'-methylbenzyl)-4-methylphenol, 1,1,3-tris-(2'methyl-4'-hydroxy-5'-tertiary butylphenyl)butane.

Light stabilizers for ethylene sulfide polymers can also be added, for example, the benzophenone light stabilizers.

A benzophenone is effective that has a 2-hydroxy-benzophenone nucleus, i.e., a nucleus of the structure

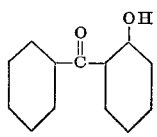

This nucleus is inclusive of the compound 2-hydroxy-benzophenone, and derivatives thereof bearing substituent groups attached to any of the ring carbon atoms of the nucleus.

The preferred benzophenones of this invention, containing a nucleus of the above structure, having the following formula:

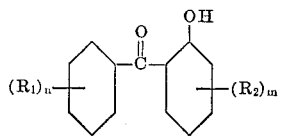

wherein $n$ is an integer from 0 to 5 and $m$ is an integer from 0 to 4 and the R radicals are selected from the group consisting of hydroxyl, halogen (such as fluorine, chlorine, bromine and iodine, and preferably chlorine or bromine) and organic radicals are selected from the group consisting of aliphatic, alicyclic aromatic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aryl, alkaryl, aralkyl, alkoxy, aryloxy, alkaryloxy, aralkoxy, oxyalkylene, hydroxyalkyl, and hydroxyalkylene radicals, and esters thereof with organic carboxylic acids. These radicals may, if desired, contain inert, nonreactive substituents such as halogen and other carbocyclic and heterocyclic ring structures and up to a total of three R-radicals are hydroxyl.

Within the above limitations, the R-radicals substituted on any ring or on different rings can be the same or different.

As typical examples of benzophenones that are intended to be included within the scope of this invention may be mentioned the following: 2-hydroxy benzophenone, 2-hydroxy - 4 - bromo-benzophenone, 2-hydroxy-4-methyl - benzophenone, 2,4 - dihydroxy-4'-tertiary - butyl-benzophenone, 2,4,4' - trihydroxy - benzophenone, 2-hydroxy - 4 - methoxy-4'-tertiary-butyl-benzophenone, 2-hydroxy-4-decyloxy-benzophenone, 2 - hydroxy-4-heptyloxy-3',4'-dimethyl-benzophenone, 2,2' - dihydroxy-4-(2-ethylhexyloxy) benzophenone, 2-hydroxy-4-benzyloxy-4'-tertiary butyl-benzophenone, 2-hydroxy-4,4'-dimyristoyloxy-benzophenone, 2-hydroxy-4-(o-chlorobenzoyloxy) benzophenone, 2-hydroxy-4-iodo-benzophenone, 2-hydroxy-4-pentachloro - benzyloxy) benzophenone, 2 - hydroxy - 4-benzyloxy-benzophenone, 2-hydroxy-4,5-dimethyl-benzophenone, 2-hydroxy-4-benzyloxy-5-chlorobenzophenone, 2 - hydroxy - 5 - hexyl - 2',4' - dimethylbenzophenone, 2 - hydroxy-4-(3,4-dichlorobenzyloxy)-4' - t - butylbenzophenone, 2-hydroxy-3-methyl - 4' - nitrobenzophenone, 2-hydroxy-(4-hexyl)-benzophenone, 2 - hydroxy-4-benzyloxy-2',4',5'-trichlorobenzophenone, 2 - hydroxy - (4-ethyl)-3'-chlorobtnzophenone, 2,4-dihydroxy-benzophenone, 2,2'-4-trihydroxybenzophenone and 4-n-decyloxy - 2,2' - dihydroxybenzophenone.

The o-hydroxy-phenylbenzotriazoles also can be used. These have the formula:

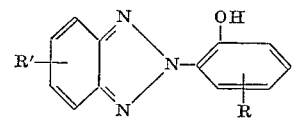

wherein R and R' are selected from the group consisting of hydrogen, hydrocarbon and oxyhydrocarbon radicals.

In the formula, the permissible R and R' substituents are numerous and varied. R and R', as stated, may each be hydrogen, in which case the compound is o-hydroxyphenylbenzotriazole, or each may be a hydrocarbon or oxyhydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxyhydrocarbon radicals are methoxy, ethoxy, propoxy, isopropoxy and the like.

Exemplary are: 2-(2-hydroxy-5-methylphenyl) benzotriazole, 5,6 - dichloro-2-(2-hydroxy-5-tertiary-butylphenyl) benzotriazole, 5 - methyl-2-(2-hydroxy-3,5-dichlorophenyl) benzotriazole.

These compounds should have a very low vapor pressure at the ethylene sulfide polymer processing temperature, for example, at temperatures of above 200° C., so that they will not be lost from the mix during hot working. Preferably, they are substantially nonvolatile at this temperature. They also should be compatible with the ethylene sulfide polymer at all temperatures to which the composition is to be subjected.

The preferred stabilizer system of the invention comprises a tin salt as defined above and a compound of the Group II to VIII metal. In addition, the composition can contain an organic phosphite and/or a phenol. Some tin compounds may impart a grayish color to the ethylene sulfide polymer. However, in such a case, a Group II to VIII metal compound will prevent development of the grayish color. The second metal compound and/or phosphite may also enhance the heat stabilizing properties of the tin compound. Such a result is especially unexpected, inasmuch as such compounds by themselves exhibit extremely poor heat stabilizing properties for ethylene sulfide polymers.

A sufficient amount of the stabilizer is used to enhance the resistance of the ethylene sulfide polymer when heated at temperatures in excess of 200° C. to deterioration in physical properties, including, for example, reduction in melt viscosity and increase in melt index. Small amounts are usually adequate. Amounts of the tin salt within the range from about 0.1 to about 5% by weight of the ethylene sulfide polymer are satisfactory. If the salt is employed in amounts of more than 5% by weight of the polymer, it may act as a plasticizer, resulting in depressed mechanical properties, such as decreased rigidity and decreased dimensional stability. Preferably, from about 2 to about 3% by weight of the tin salt is employed, for optimum enhancement of resistance to heat deterioration.

A tin salt can be used as a catalyst in the formation of the polymer from ethylene sulfide, and any residue of such catalyst remaining with the polymer will enhance the resistance of the polymer to heat deterioration. Thus, the tin salt can be added ab initio in preparation of the polymer. However, the polymerization may lead to loss of tin salt, and thus it must also be used ab initio in an amount to suffice both for stabilization and polymerization. Hence, amounts of from 0.5 to 10% may be required in this embodiment.

The compound of the Group II–VIII metal can be used in quantities as low as 0.1% by weight of the polymer, and preferably in amounts of from about 2 to about 3% by weight of the polymer. Where more than about 5% is employed, a depressing effect on mechanical properties of the polymer may occur.

The organic phosphite and/or phenol can be employed in amounts of from about 0.05 to about 5% by weight of the polymer.

Combinations of the tin salt and the remaining stabilizers can be formulated as simple mixtures or homogeneous solutions or dispersions, and marketed as such, for incorporation in the polymer by the polymer manufacturer or by the converter.

Combinations of stabilizers will generally contain from about 1 to about 50 parts of the tin salt, and, when employed as part of the combination, from about 1 to about 50 parts of the Group II to VIII metal compound, and from about 0.5 to about 100 parts organic phosphite and/or phenol, by weight of the combination.

The high melting ethylene sulfide polymers can be defined in a manner to differentiate them from other ethylene sulfide polymers by having a molecular weight of at least about 10,000, a melting point above 200° C., and a crystallinity of 70% or more. The stabilizers or stabilizer combinations of the invention are applicable to all of such ethylene sulfide polymers. Moreover, they are effective as well with the lower melting, lower molecular weight ethylene sulfide polymers in solid, liquid, semi-liquid or gel-like forms. Since such polymers are processed at lower temperatures, they present a less difficult stabilization problem.

The stabilizer of the invention is applicable to ethylene sulfide polymers prepared by any of a number of procedures including those described hereinbefore. The molecular weight of the polymers is not a factor affecting this stabilizer.

Mixtures of ethylene sulfide polymers with other compatible polymers, and copolymers of ethylene sulfide polymers with copolymerizable monomers not reactive with the ethylene sulfide polymer stabilizer combination, the ethylene sulfide polymer or copolymer being present in a sufficient amount, usually a major amount, to present the stabilization problem resolved by the invention, also can be stabilized, including, for example, mixtures of ethylene sulfide polymers with olefin polymers such as polyethylene, polypropylene, polyisobutylene, and copolymers with propylene sulfide, butylene sulfide, allyl thioglycidyl ether, thioglycidyl acrylate, isoprene mono-episulfide, vinyl cyclohexene mono-episulfide, and butadiene mono-episulfide.

The stabilizer of the invention is incorporated in the ethylene sulfide polymer manually or in suitable mixing equipment, such as a Waring blender, to provide a homogeneous mixture. If the ethylene sulfide polymer has a melt viscosity which is too high for the desired use, the ethylene sulfide polymer can be worked until its melt viscosity has been reduced to the desired range, before addition of the stabilizer. The resulting mixture is then removed from the mixing equipment, and brought to the size and shape desired for marketing or use.

Prior to mixing, the polymer and the stabilizer incorporated in said polymer, can be preheated, for example, at 110° C., for about an hour, and then be mixed. Such a preheating step will aid in substantially eliminating any gray or darkened color which might develop after the stabilizer is mixed into the polymer. An inert solvent such as hexane or benzene can be added to the stabilizer-polymer combination during the preheating treatment step, to aid in the subsequent formation of a substantially homogeneous mixture during the mixing step.

The ethylene sulfide polymer containing the stabilizers of the invention can be worked into the desired shape by any conventional processing technique, such as by injection molding or fiber forming. In such operations, it will be found to have a considerably improved resistance to reduction in melt viscosity during the heating, as well as a better resistance to increase in melt index.

The effect of the stabilizer of the invention in reducing the rate of increase in melt index is a good measure of the degree of heat stabilization imparted by the compounds of the invention, and therefore was used as a gauge in the working examples which follow, in accordance with the following test procedure.

An apparatus for determining (ASTM D 1238–62T) melt index, referred to herein as an extrusion plastometer, was employed which consisted of an insulated block, at least 6 inches high, containing a cylindrical passageway 0.375 inch in diameter starting at the top end of the block and stopping short of the bottom end of the block, a portion of the passageway in close proximity to the bottom end of the block being in communication with a second cylindrical passageway 0.0825 inch in diameter and 0.315 inch in length and terminating in an orifice opening at the bottom end of the block. In carrying out the melt index determination, the temperature of the extrusion plastometer was maintained at 230°±1° C. The cylindrical opening at the top end of the block and the orifice opening at the bottom end thereof were cleaned out and the orifice opening was blocked with a metal rod. A stopwatch was started and 8 grams of an ethylene sulfide polymer charge to be tested was poured into the top of the cylindrical passageway as rapidly as possible without loss. A piston weighing 56 grams having a diameter of 0.375 inch at its lower end, and a length of at least 8½ inches, fashioned with an insulated shoulder or step, 2 inches down from its insulated upper end, was used to tamp the charge into the cylindrical opening. When the entire charge was loaded, the piston was inserted on top of the charge, and a 5000 gram compressing load was placed on the step at the upper end of the piston.

After a six minute preheat period time measured from the start of charging, the compressing load was replaced by a 2105±5 gram working load and the orifice opening was unblocked. The molten charge then began to extrude through the 0.0825 inch orifice. Exactly two minutes later, the extrudate was severed at the bottom of the orifice and placed into a cup. At the end of each succeeding minute, extrudate was cut off and placed into a separate cup. After the entire charge had been extruded, the total time was noted. Each minute's extrudate was weighed, and the color of the extrudate was noted.

The effect on change in rate of flow through the extrusion plastometer of an ethylene sulfide polymer over the time intervals measured corresponds to the effect on change in rate of melt index over the same periods, and thus is an accurate measure of resistance to heat deterioration imparted by the stabilizer added to the polymer.

To evaluate the effect of the stabilizer of the invention on reduction of melt viscosity a Brabender Plastograph was employed. This instrument is essentially a heated sigma blade mixer in which the torque applied to the blades at 32.5 r.p.m.'s is continuously measured, and plotted on a chart as gram-meters of torque. The bowl is maintained at 230° C. The ethylene sulfide polymer used in the evaluations of the examples was prepared as follows.

Example A

A stainless steel polymerization bomb previously flushed with dry nitrogen was charged with 100 cc. of benzene, 25.1 g. ethylene sulfide and 2.4 g. of zinc sulfide. The bomb was closed and rotated for two hours in a water bath kept at 80° C. The bomb was then removed from the water bath, cooled to room temperature, and opened. The contents of the bomb were rinsed into a glass dish with benzene, and then dried 24 hours at 50° C. under a reduced pressure of 5 mm. of mercury. The product was a white, crystalline polyethylene sulfide with a melting range of 202 to 207° C. The yield was 25.1 g.

This polymer was a thermoplastic polyethylene sulfide material, having a melting point of about 205° C., a density of 1.34 g./cc., a tensile modulus of 10,500 p.s.i., a molecular weight above 10,000, and a flexural strength of 10,400 p.s.i.

The following examples, in the opinion of the inventor, represent the best embodiments of his invention:

Examples 1 to 4

A group of tin salt stabilizers of the invention was evaluated for their inhibiting effect on rate of increase in melt index of the ethylene sulfide polymer of Example A. The tin stabilizers were weighed and added to the powdered ethylene sulfide polymer, and the mixtures were stirred using a Waring blender. Eight gram portions of each stabilizer-polymer mixture were then submitted to the melt index determination procedure described hereinbefore.

Table 1 tabulates the various stabilizers and quantities used with the ethylene sulfide polymer in parts by weight of stabilizer per 100 parts of the polymer (hereinafter referred to as phr.). Table I shows the weight in grams of extrudate collected during the second, third, fourth and fifth minutes of the time taken for 8 grams of charge to flow through the extrusion plastometer, and the color of the extrudate obtained.

The material referred to here and in later examples as stannous carboxylate was a 90:10 mixture of stannous caprate and stannous caprylate.

TABLE I

| Example No. | Stabilizer | Parts per hundred | Time (minutes) for 8 grams to be extruded | Weight in grams collected during | | | | Color |
|---|---|---|---|---|---|---|---|---|
| | | | | Second minute | Third minute | Fourth minute | Fifth minute | |
| Control A | None | | (1) | | | | | |
| Control B | Titanium dioxide | 2 | (1) | | | | | White. |
| Control C | Zinc stearate | 2 | (1) | | | | | Do. |
| 1 | Stannous carboxylate | 3 | 4.5 | 1.33 | 1.55 | 1.79 | | Dark gray. |
| 2 | Stannous 2-ethyl hexoate | 2 | 4.75 | 1.40 | 1.64 | 1.89 | | Light gray. |
| 3 | Stannous laurate | 2 | 5.5 | 1.01 | 1.30 | 1.51 | 1.71 | White. |
| 4 | Stannous stearate | 3 | 5 | 1.20 | 1.43 | 1.59 | 1.76 | Light gray |

[1] Less than 1.

Control A shows that the ethylene sulfide polymer without any stabilizer incorporated therein in accordance with the invention, was extruded in less than one minute, and accordingly its rate of increase in flow rate was too high to be measured accurately. Examples 1 to 4 show that the tin salt reduced the rate of increase in flow rate of the polymer and its flow rate through the extrusion plastometer to substantially less than that of the polymer of Example A alone. Accordingly, this data clearly indicates that the addition of a heat stabilizer of this invention to an ethylene sulfide polymer markedly slowed down the rate of deterioration of the polymer when heated under the test conditions.

Controls B and C show that titanium and zinc compounds are ineffective.

Examples 5 to 17

A group of Group II to VIII metal compounds was evaluated for their effect in preventing color development and rate of increase in melt index of the polymer of Example A containing tin salt stabilizers, using the same procedure as described in Examples 1 to 4.

The data obtained is reported in Table II.

TABLE II

| Example No. | Stabilizer | Parts per hundred | Time (minutes) for 8 grams to be extruded | Weight in grams collected during | | | | Color |
|---|---|---|---|---|---|---|---|---|
| | | | | Second minute | Third minute | Fourth minute | Fifth minute | |
| 5 | Stannous carboxylate / Zinc 2-ethylhexoate | 2 / 1 | 5 | 1.51 | 1.53 | 1.56 | 1.76 | White. |
| 6 | Stannous carboxylate / Zinc oxide | 2 / 1 | 5.5 | 0.87 | 1.33 | 1.69 | 1.73 | Very light gray. |
| 7 | Stannous 2-ethylhexoate / Zinc oxide | 2 / 1 | 5 | 1.15 | 1.41 | 1.70 | 2.03 | White. |
| 8 | Stannous stearate / Zinc 2-ethylhexoate | 2 / 1 | 5 | 1.21 | 1.56 | 1.69 | 1.87 | Do. |
| 9 | Stannous stearate / Antimony trioxide | 2 / 1 | 6.5 | 0.58 | 0.72 | 0.89 | 1.13 | Do. |
| 10 | Stannous stearate / Antimony trioxide | 1.5 / 1.5 | 8.5 | 0.55 | 0.72 | 0.68 | 0.73 | Do. |
| 11 | Stannous stearate / Zinc oxide | 2 / 1 | 5 | 1.25 | 1.58 | 1.68 | 1.83 | Do. |
| 12 | Stannous stearate / Antimony pentoxide | 2 / 1 | 7.5 | 1.23 | 1.50 | 1.46 | 1.54 | Cream. |
| 13 | Stannous stearate / Zinc stearate | 2 / 1 | 5 | 1.16 | 1.51 | 1.58 | 1.68 | White. |
| 14 | Stannous stearate / Tetra-2-ethylhexyl titanate | 2 / 1 | 6 | 1.20 | 1.10 | 1.00 | 1.00 | Yellow. |
| 15 | Stannous stearate / Antimony trioxide | 1 / 2 | 6.5 | 0.82 | 1.08 | 1.24 | 1.67 | White. |
| 16 | Stannous stearate / Arsenic tri-oxide | 2 / 1 | 7.5 | 0.62 | 1.10 | 0.90 | 0.78 | Do. |
| 17 | Stannous stearate / Isooctyl arsenite | 2 / 1 | 6.5 | 0.61 | 1.10 | 1.60 | 1.80 | Do. |

In comparing the results indicated in Table II with that in Table I, it is seen that the Group II to VIII metal compound clearly inhibited the formation of gray or dark color in the stabilized polymers, and in some cases enhanced the heat stabilizing properties of the tin salts. Thus, in comparing the results of Example No. 1 with Examples Nos. 5 and 6, Example No. 2 with Example 7, and Example No. 4 with Examples Nos. 8 to 17, it is clearly seen that the zinc-2-ethylhexoate, zinc oxide, antimony trioxide, antimony pentoxide, zinc stearate, tetra-2-ethyl hexyl titanate, arsenic trioxide, and isooctyl arsenite inhibited the formation of a dark color in the stabilized polymer.

In comparing the results of Example No. 4 with these examples, it is also seen that the zinc oxide, antimony trioxide, antimony pentoxide, arsenic oxide, tetra-2-ethylhexyl titanate, and isooctyl arsenite, significantly enhanced the stabilizing effectiveness of the tin salts.

EXAMPLES 18 AND 19

A phosphite compound, namely, diphenyl phosphite, was evaluated for its effect in inhibiting rate of increase in melt index of the polymer of Example A in combination with stannous carboxylate and zinc-2-ethylhexoate. The procedure used was the same as that described in Examples 1 to 4.

The data obtained is reported in Table III.

fide polymer of Example A, using the Brabender apparatus described hereinbefore.

The test compositions were prepared by adding various quantities of stabilizer in accordance with the invention to 100 parts of the unstabilized ethylene sulfide polymer. The mixtures were stirred using a Waring Blendor. The mixtures were then subjected to the Brabender Plastograph test to determine reduction in melt and viscosity of the stabilized polymer under Plastograph conditions. Table IV below tabulates the compositions used and the torque measurements obtained at various times.

TABLE IV

| Composition | Example 21 | Example 22 | t o l |
|---|---|---|---|
| | Stannous carboxylate (2 phr.) Zinc 2-ethylhexoate (1 phr.) | Stannous stearate (1.5 phr.) Antimony trioxide (1.5 phr.) | Polymer alone |
| Torque measurement in gram meters after working for: | | | |
| 0 minutes | >1,800 | >1,800 | >1,800 |
| 2 minutes | 1,700 | >1,800 | 1,500 |
| 4 minutes | 1,400 | >1,800 | 1,200 |
| 8 minutes | 1,080 | 1,240 | 800 |
| 16 minutes | 660 | 1,030 | <400 |
| 20 minutes | 560 | 900 | |

The above data clearly indicate that the ethylene sulfide polymer-stabilizer combinations used in accordance with the invention greatly increased the resistance of the polymer to reduction in melt viscosity when heated under the test conditions.

Having regard to the foregoing disclosure, the following is claimed as the inventive and patentable embodiments thereof:

1. An ethylene sulfide polymer stabilizer combination capable of enhancing the resistance of the polymer to deterioration at temperatures in excess of about 200° C., as evidenced by a lesser reduction in melt viscosity when heated at such temperatures, consisting essentially of about 1 to about 50 parts by weight of an organotin

TABLE III

| | | | Extrudate | | | | | |
|---|---|---|---|---|---|---|---|---|
| Example No. | Stabilizer | Parts per hundred | Time (minutes) for 8 grams to be extruded | Weight in grams collected during | | | | Color |
| | | | | Second minute | Third minute | Fourth minute | Fifth minute | |
| 18 | Stannous carboxylate Zinc 2-ethylhexoate Diphenyl phosphite | 2 1 0.1 | 6 | 0.90 | 1.08 | 1.21 | 1.34 | White. |
| 19 | Stannous carboxylate Zinc 2-ethylhexoate Diphenyl phosphite | 2 1 0.25 | 6.75 | 0.78 | 0.90 | 1.09 | 1.37 | Do. |

In comparing the data of Example 5 with Examples 18 and 19, it is clearly seen that the phosphite further enhanced the stabilizing effectiveness of the stannous carboxylate-zinc-2-ethylhexoate combination.

EXAMPLE 20

A benzophenone stabilizer, namely, 2-hydroxy-4-octyloxy-benzophenone, in an amount of 0.5 phr., was evaluated in the polymer of Example A containing 2 phr. of stannous stearate and 1 phr. of antimony trioxide. The procedure used was the same as described in Examples 1 to 4. It took a total of 7.5 minutes for the 8 grams of charge to be extruded. The weight in grams of extrudate collected during each time interval was 0.57 g. during the second minute, 0.63 g. during the third minute, 0.88 g. during the fourth minute, 1.18 g. during the fifth minute, 1.17 g. during the sixth minute, and 1.52 g. during the seventh minute.

A comparison of Example 9 with Example 20 shows that the benzophenone enhanced the effectiveness of the stannous stearate-antimony trioxide combination in increasing the resistance of the polymer to heat deterioration.

EXAMPLES 21 AND 22

The stabilizer of the invention was evaluated for its effect on reduction in melt viscosity of the ethylene sulcompound having only organic radicals, each of which is attached to tin through oxygen, and selected from the group consisting of organotin carboxylates, wherein the carboxylic acid contains up to about twenty carbon atoms, organotin phenolates wherein the phenol group is selected from the group consisting of monocyclic or polycyclic mono or polyphenol groups or hydrocarbon-substituted such phenol groups wherein the hydrocarbon substituent contains from about one to about thirty carbon atoms and is selected from the group consisting of alkyl, alkenyl and aryl groups, and organotin alcoholates wherein the alcoholic group contains from about one to about ten hydroxyl groups and from about one to about twenty carbon atoms; and from about 1 to about 50 parts by weight of a polyvalent metal compound of a metal selected from Groups II to VIII of the Periodic Table and selected from the group consisting of oxides and salts of inorganic acids, organic acids, phenols and alcohols and wherein the organic acids are carboxylic acids having up to about twenty carbon atoms, the phenols are selected from the group consisting of monocyclic or polycyclic mono or polyphenol groups or hydrocarbon-substituted such phenol groups wherein the hydrocarbon substituent contains from about one to about thirty carbon atoms and is selected from the group consisting of alkyl, alkenyl and aryl groups and the alcohols contain from about one to about ten hydroxyl groups and from about one to about twenty carbon atoms to enhance the stabilizing effect of the tin salt in the presence of the ethylene sulfide polymer, and providing that if tin is the polyvalent metal, the polyvalent metal tin compound is different from the organotin compound.

2. An ethylene sulfide polymer stabilizer combination in accordance with claim 1 wherein the organotin compound is a carboxylate wherein the organic acid portion is derived from acids selected from the group consisting of aliphatic, aromatic, cycloaliphatic, and oxygen-containing mono- and polycarboxylic acids.

3. An ethylene sulfide polymer stabilizer combination in accordance with claim 1 wherein the organotin compound is a phenolate.

4. An ethylene sulfide polymer stabilizer combination in accordance with claim 1 wherein the organotin compound is an alcoholate derived from alcohols selected from the group consisting of aliphatic, aromatic, cycloaliphatic, and heterocyclic monohydric and polyhydric alcohols.

5. An ethylene sulfide polymer stabilizer combination in accordance with claim 1 wherein the polyvalent metal compound is an oxide.

6. An ethylene sulfide polymer stabilizer combination in accordance with claim 1 wherein the polyvalent metal compound is a salt of an inorganic acid which is a member selected from the group consisting of oxygen acids and halogen acids.

7. An ethylene sulfide polymer stabilizer combination in accordance with claim 1 wherein the polyvalent metal compound is a salt of an organic acid.

References Cited
UNITED STATES PATENTS

| | | | |
|---|---|---|---|
| 3,183,238 | 5/1965 | Barbanson | 260—45.75 |
| 3,297,630 | 1/1967 | Giordano | 260—18 X |

LEON D. ROSDOL, *Primary Examiner.*

I. GLUCK, *Assistant Examiner.*